United States Patent
Nielsen

[19]
[11] Patent Number: 6,069,625
[45] Date of Patent: May 30, 2000

[54] METHOD AND SYSTEM FOR EFFICIENT ORGANIZATION OF SELECTABLE ELEMENTS ON A GRAPHICAL USER INTERFACE

[75] Inventor: Jakob Nielsen, Atherton, Calif.

[73] Assignee: Sun Microsystems, Inc., Palo Alto, Calif.

[*] Notice: This patent is subject to a terminal disclaimer.

[21] Appl. No.: 09/347,464

[22] Filed: Jul. 6, 1999

Related U.S. Application Data

[63] Continuation of application No. 09/119,603, Jul. 2, 1998, Pat. No. 6,005,567, which is a continuation of application No. 08/679,539, Jul. 12, 1996, Pat. No. 5,897,670.

[51] Int. Cl.[7] ......................................................... G06F 7/00
[52] U.S. Cl. ........................... 345/334; 345/346; 345/352
[58] Field of Search ..................................... 345/333, 334, 345/335, 339, 352, 353, 346, 337, 356, 357

[56] References Cited

U.S. PATENT DOCUMENTS

| | | |
|---|---|---|
| 5,367,626 | 11/1994 | Morioka et al. . |
| 5,377,317 | 12/1994 | Bates et al. . |
| 5,394,523 | 2/1995 | Harris . |
| 5,396,264 | 3/1995 | Falcone et al. ......................... 345/146 |
| 5,428,722 | 6/1995 | Marsh et al. . |
| 5,428,744 | 6/1995 | Webb et al. . |
| 5,442,745 | 8/1995 | Hirose . |
| 5,455,599 | 10/1995 | Cabral et al. . |
| 5,465,358 | 11/1995 | Blades et al. . |
| 5,465,362 | 11/1995 | Orton et al. . |
| 5,479,589 | 12/1995 | Peterson et al. . |
| 5,500,929 | 3/1996 | Dickinson . |
| 5,517,606 | 5/1996 | Matheny et al. . |
| 5,519,818 | 5/1996 | Peterson . |
| 5,522,025 | 5/1996 | Rosenstein . |
| 5,537,618 | 7/1996 | Boulton et al. ......................... 345/335 |
| 5,544,301 | 8/1996 | Orton et al. . |
| 5,555,368 | 9/1996 | Orton et al. . |
| 5,621,434 | 4/1997 | Marsh . |
| 5,625,781 | 4/1997 | Cline et al. ............................. 345/335 |
| 5,634,129 | 5/1997 | Dickinson . |

*Primary Examiner*—Raymond J. Bayerl
*Assistant Examiner*—Cao H. Nguyen
*Attorney, Agent, or Firm*—McDermott, Will & Emery

[57] ABSTRACT

In a preferred embodiment, the present invention provides a method and system for organizing selectable elements on a graphical user interface (GUI). Initially, the method provides at least two selectable elements for display on a GUI. Each selectable element is associated with a target element when it is selected. The method generates a first access frequency index for each selectable element in the list which corresponds to a number of times the selectable element is selected. Next, the selectable elements are organized on the GUI based upon the first access frequency index generated for each selectable element. In one embodiment, the selectable elements with a higher first access frequency index are placed in first area on the GUI while selectable elements with a lower first access frequency index are placed in a second area on the GUI. As a result, a user can select the selectable elements on a GUI easier when they are organized according to the principles of this invention.

21 Claims, 6 Drawing Sheets

METHOD AND SYSTEM FOR EFFICIENT ORGANIZATION OF SELECTABLE ELEMENTS ON A GRAPHICAL USER INTERFACE

This application is a continuation of application Ser. No. 09/119,603 filed Jul. 2, 1998, now U.S. Pat. No. 6,005,567, which is a continuation of application Ser. No. 08/679,539 filed Jul. 12, 1996, now U.S. Pat. No. 5,897,670.

FIELD OF THE INVENTION

The present invention relates generally to graphical user interfaces (GUI) and, more specifically, a method and apparatus for organizing selectable elements on a GUI in an efficient manner.

BACKGROUND OF THE INVENTION

Most computer based applications are controlled with a graphical user interface (GUI). A GUI displays selectable elements, such as hypertext links and GUI buttons, on a display device for a user to view and select. When a selectable element is selected the underlying computer based application responds by providing information and performing certain operations. In most cases, the burden is upon the user to determine which selectable element will perform the necessary functions and achieve the desired results.

Organizing the selectable elements on a GUI in a logical manner can help a user determine with selectable element should be selected. Typically, the most frequently used selectable elements are located in an area on the GUI a user can easily access. This arrangement reduces the amount of time a user must search for a selectable element capable of performing a particular task. The additional time can be used to process addition information and perform more tasks.

In the past, computer application designers used surveys, focus groups and other similar techniques to determine which selectable elements on a GUI would be most frequently accessed. The computer designers then used this information to organize the selectable elements on a GUI. If these conventional methods were accurate, the selectable elements were organized on the GUI in an efficient manner and the GUI was easy to use.

There are several reasons, however, why these conventional techniques are not the best method or organizing selectable elements on a GUI. First, traditional techniques for organizing selectable elements on a GUI are static and do not dynamically change as the underlying application or information evolves. Generally, the organization of selectable elements on a GUI is fixed at the time a computer based applications is developed. For example, a specialized type of GUI based computer application called a "Frequently Asked Question" or FAQ contains a list of questions most frequently asked on a particular topic. Typically, the user's have new questions when the underlying topic or software application is modified. Unfortunately, the traditional FAQ is quickly outdated because these new questions are not accounted for in the FAQ. There is a need to develop FAQs which organize the most frequently asked questions on a GUI automatically.

Second, selectable elements on a GUI are not organized for different categories of users. Typically, users with different skill levels require different questions to be answered when working with a computer application. Existing methods of organizing selectable elements on a GUI do not automatically change as a user gains more experience. Similarly, users who execute the same computer applications on different computer platforms, such as Unix or MacIntosh, will also have different types of questions. There is a need to organize selectable elements which depend on different categories of users.

Third, the current methods for determining which questions are frequently asked is inefficient because they are done manually. Currently, the computer application designer must manually collect information on which selectable elements are the most frequently selected. This process of collecting information is tedious, time consuming, and subject to numerous human errors. Moreover, it is difficult to determine which selectable elements are frequently selected when the sample size is statistically small or insignificant.

There is a need to develop a method and apparatus for automatically organizing the selectable elements on a GUI as the users needs change and the underlying computer based application receives new features.

SUMMARY OF THE INVENTION

Embodiments of the present invention provide features which were previously unavailable in the art. In one embodiment, the invention automatically organizes selectable elements on a GUI as the underlying software application evolves. Embodiments of the present invention automatically determine which selectable elements are selected most frequently. The invention then organizes these selectable elements on an area of the GUI which can be easily selected by a user.

In a preferred embodiment, the present invention provides a method and system for organizing selectable elements on a graphical user interface (GUI). Initially, the method provides a list of at least two selectable elements for display on a GUI. Each selectable element is associated with a target element when it is selected. The method generates a first access frequency index for each selectable element in the list which corresponds to a number of times the selectable element is selected. Next, the selectable elements are organized on the GUI based upon the first access frequency index generated for each selectable element. In one embodiment, the selectable elements with a higher first access frequency index are placed in a first area on the GUI while selectable elements with a lower first access frequency index are placed in a second area on the GUI.

In another embodiment, the target element is associated with a sublist of selectable subelements. A second access frequency index is assigned to each of the selectable subelements provided in the sublist. The second access frequency index corresponds to a number of times the selectable subelement is selected. In one embodiment the selectable subelement with a higher second access frequency index are placed in a first area on the GUI while the selectable subelements with a lower second access frequency are placed in a second area on the GUI. Typically, the first access frequency index is modified to have a magnitude corresponding to the sum of the first access frequency index and the second access frequency index. The modified first access frequency index is used to organize the selectable elements in the list.

NOTATIONS AND NOMENCLATURE

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

DETAILED DESCRIPTION

Overview of System Environment

Figure 1:
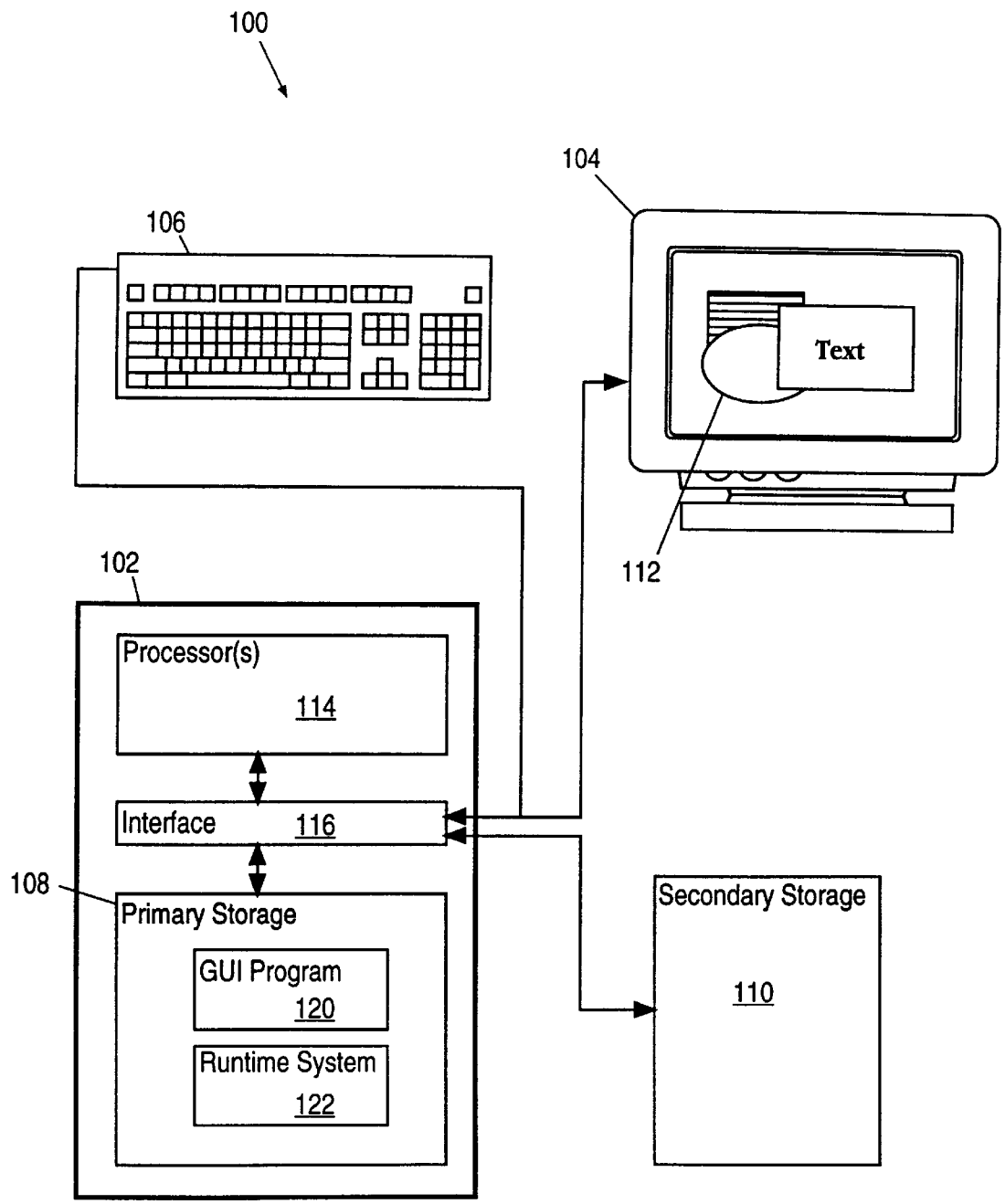
FIG. 1 is a block diagram of a computer system for practicing various embodiments of the present invention.

FIG. 1 is a block diagram of a computer system 100 for practicing various embodiments of the present invention. Typically, a computer system 100 includes a computer 102, a display device 104, an input device 106 such as a keyboard, a primary storage device 108 and a secondary storage device 110. The display device 104 displays a graphical user interface (GUI) 112 for facilitating the display of graphics and text for the user using the system 100. Display devices 104 include, for example, printers and computer display screens such as cathode ray tubes (CRT's), light-emitting diode (LED) displays, and liquid crystal displays (LCD's). Input devices 106 can include, without limitation, electronic keyboards and pointing devices such as electronic mice, trackballs, lightpens, thumbwheels, digitizing tablets, and touch sensitive pads.

The computer 102 includes one or more processors 114 which fetch computer instructions from a primary storage 108 through an interface 116, such as an input/output subsystem. Computer 102 can be, but is not limited to, any of the SPARCstation or Ultra workstation computer systems available from Sun Microsystems, Inc. of Mountain View, Calif., any of the Macintosh computer systems base don the Power PC processor and available from Apple Computer, Inc. of Cupertino, Calif., or any computer system compatible with the IBM PC computer systems available from International Business Machines, Corp of Armonk, N.Y., which are based upon the X86 series of processors available from the Intel Corporation or compatible processors.[1] Processor 114 executes these fetched computer instructions. The processor 114 can be, but is not limited to, any of the SPARC processors available from Sun Microsystems, Inc. of Mountain View, Calif. or any processors compatible therewith. Executing these computer instructions enables the processor 114 to retrieve data or write data to the primary storage 108, display information on one or more computer display devices 104, receive command signals from one or more input devices 106, or transfer data to secondary storage 110 or even other computer system which collectively form a computer network (not shown). Those skilled in the art understand that primary storage 108 and secondary storage 110 can include any type of computer storage including, without limitation, randomly accessible memory (RAM), read-only-memory (ROM), application specific integrated circuits (ASIC) and storage devices which include magnetic and optical storage media such as CD-ROM.

[1]. Sun, Sun Microsystems, the Sun Logo, Java and Javascript are trademarks or registered trademarks of SPARC International, Inc. in the United States and other countries. Products bearing the SPARC or Ultra trademarks are based upon an architecture developed by Sun Microsystems, Inc.

The primary storage 108 stores a number of items including a GUI program 120 and an runtime environment 122. The runtime environment 122 typically is an operating system which manages computer resources, such as memory, disk or processor time, required for embodiments of the present invention to operate. The runtime environment 122 may also be a microkernel, a message passing system, a dynamic loadable linkable module, a browser application for the World Wide Web, a runtime interpreter environment, or any other system which manages computer resources.

Exemplary Steps of One Embodiment

Figure 2:
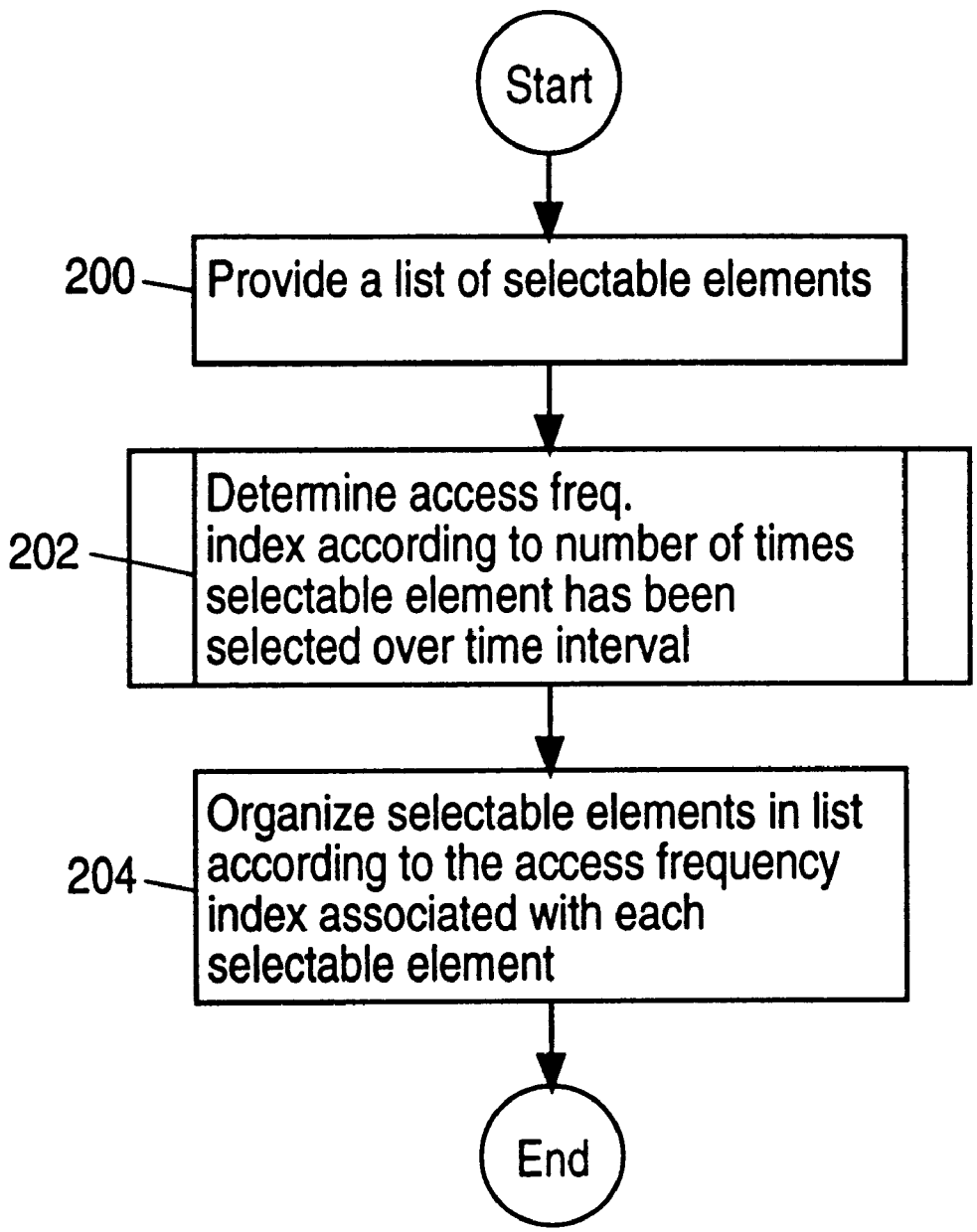
FIG. 2 is a flow diagram showing the general steps for the organization of selectable elements on a graphical user interface using one embodiment of the present invention.
Figure 3:
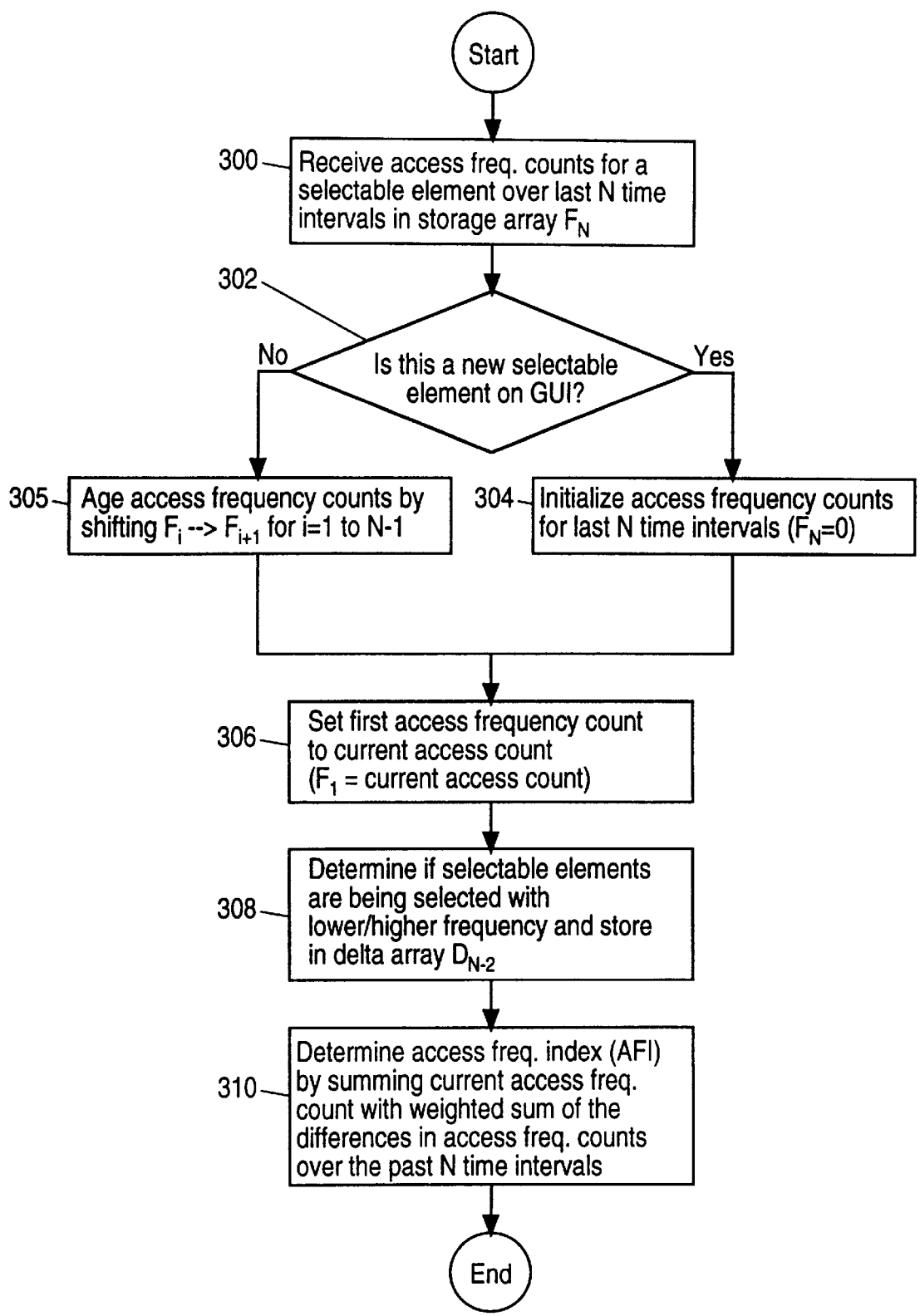
FIG. 3 is flow diagram showing one embodiment for determining the access frequency index of a selectable element.
Figure 4:
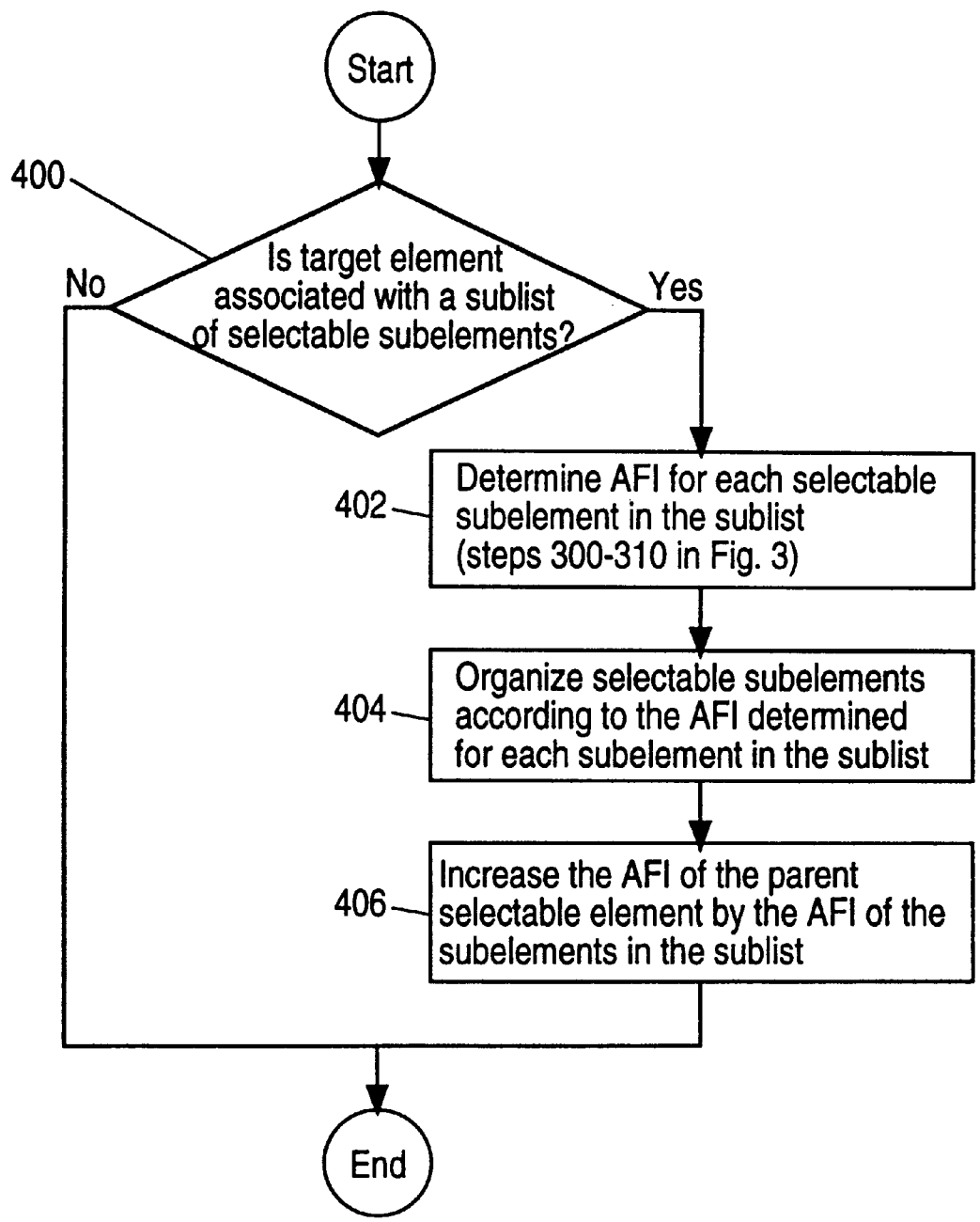
FIG. 4 is a flow diagram which shows the general steps for generating the access frequency index (AFI) when the selectable elements are provided in a hierarchical arrangement.

FIGS. 2–4 illustrates one method for practicing the present invention. The flow diagrams described herein broadly illustrate the logical flow of steps to perform one embodiment of the present invention. Accordingly, numerous steps may be added to, or taken away from the flow diagrams, without departing from the scope of the invention. Furthermore, the order of execution of the steps in the flow diagrams may be changed without departing from the scope of the invention. Additional considerations in implementing the method described by the flow diagrams may also dictate changes in the selection and order of the steps FIG. 2 is a flow diagram showing the general steps for the organizing selectable elements on a graphical user interface using one embodiment of the present invention. At step 200, the method receives a list of selectable elements for display on a display device. Selecting a selectable element with a pointing device or an input device capable of selecting a selectable element produces a target element. The target element may be information, an operation in an application or a sublist of selectable subelements. These selectable elements can be hypertext links on an FAQ which display the frequently asked question on a web page on the World Wide Web (WWW) or other network. They can also be GUI buttons or other selectable elements located on any computer application running over a network.

At step 202, an access frequency index (AFI) is determined for each selectable element provided in step 200. The AFI, described in further detail below, measures the frequency each selectable element has been selected over a period of time. At step 204, the selectable elements are organized on the GUI based on the AFI associated with each selectable element. In general, selectable elements with a larger AFI are placed on a more accessible area on the GUI. Those selectable elements with a smaller AFI are placed on a less accessible area on the GUI. In one embodiment, the selectable elements are sorted on the GUI in descending order of their respective AFIs. The selectable elements can be organized on the GUI when the user requests them to be organized or at a predetermined time interval such as once a day.

FIG. 3 is a flow diagram showing one embodiment for determining the AFI of a selectable element. At step 300, the method receives the access frequency counts over the past N time intervals for each selectable element on the GUI. Numerous counters well known in the art can be used to count the number of times a selectable element on a GUI is accessed. In one embodiment, a counter device is incremented once each time the selectable element is selected. In an alternative embodiment, the counter device for a selectable element is incremented multiple times if it is the first selectable element the user has selected on the GUI. The counter is incremented multiple times because the first selectable element selected by a user is typically more important than other selectable elements in the list.

Typically, the counter keeps a cumulative total of the number of times a selectable element has been selected over a period of time. In one embodiment, the invention receives a set of N access frequency counts from the counter and stores them in a storage array $F_N$ having N storage elements. Each selectable element on the GUI is associated with a different storage array $F_N$. Storing only the N most recent access frequency counts eliminates from further calculations all access frequency counts received beyond the N time intervals in the past.

At step 302, the method determines if the selectable element is a new selectable element which has not been selected during one of the previous N time intervals. If the selectable element is new, at step 304 a new storage array $F_N$ is created and all the storage elements are initialized to an initial value such as 0. If the selectable element is not new, at step 305 the method "ages" the elements stored in the storage array $F_N$ by shifting the access frequency count in position $F_i$ to position $F_{i+1}$ for i=1 to N-1. The method collects information over several time intervals to smooth statistical irregularities which can occur if the method were to make a determination at a single point in time. In one embodiment, the storage array $F_N$ holds access counts for 10 intervals (N=10) and the storage array is updated once every 24 hour period or once a day. After step 304 or step 305, step 306 sets the first element in storage array $F_N$, storage element $F_1$, to the current access count provided by the counter device.

At step 308, the values stored in the N-1 elements in delta array ($D_{N-1}$) are determined by calculating the change in the access count frequencies stored in storage array $F_N$. In one embodiment, the values are determined according to the following relationship (1):

$$\text{For } i=2 \text{ to } N: D_{i-1} = \max((F_{i-1} - F_i), 0) \tag{1}$$

where:

$D_{i-1}$: An array with N-1 elements which stores changes in the access frequency count over a N time intervals.

$F_{i-1} - F_i$: Difference between access frequency counts at times i-1 and i.

$\max((F_{i-1} - F_i), 0)$: Function ensures all delta values are greater than or equal to 0.

In relationship (1) above, delta array $D_{N-2}$ indicates if a selectable element is being selected with a higher or lower frequency over a number of time intervals. Generally, the delta array $D_{N-2}$ contains N-1 non-negative values because the access count counted by the counter device increases later in time. Occasionally, the counter has a lower value later in time if it is reset in between one of the N time intervals. If this occurs, the "max" function provides a non-negative result (i.e. a zero value) to ensure that erroneous results are not generated later on.

At step 310, the AFI is determined by weighting each value in the delta array $D_{N-2}$ and adding them together with the current access frequency count in the counter. In one embodiment, the AFI can be determined according to the following relationship (2):

$$\text{AFI} = F_1 + \text{SUM } i=2 \text{ to } N [D_i \times ((N+1)-i)] \tag{2}$$

where:

AFI: Access frequency index $F_1$: Current access frequency count for this selectable element.

i=2 to N: Range of time intervals (i) going from an newest time interval (2) to the oldest time interval (N).

$[D_i \times ((N+1)-i)]$:

Relationship which attributes more weight to values in the delta array ($D_{N-1}$) general earlier in time than values in the delta array ($D_{N-1}$) generated later in time.

The AFI is an index used to determine which selectable elements are more frequently selected and should thus be more easily accessed on the GUI. The values stored in the delta array $D_{N-1}$ show the change in frequency access counts over a number of time intervals. The weighting factor ((N+1)-i) "ages" these values by attributing more weight to values stored in the more recent time intervals than values stored in older time intervals. This technique makes access frequency counts received in the newer time intervals a more significant factor in calculating the AFI than access frequency counts received in older time intervals. Those skilled in the art understand that similar types of aging relationships can also be used to determine the AFI. Applying the AFI described above is novel technique for generating an AFI and organizing selectable elements on a GUI.

In another embodiment, the present invention also organizes selectable elements provided in a hierarchical arrangement. FIG. 4 is a flow diagram which shows the general steps for generating the AFI when the selectable elements are provided in a hierarchical arrangement. Initially, the method receives a number of selectable elements provided in a hierarchical arrangement. Typically, the initial hierarchical arrangement of selectable elements is determined by a computer application designer. When a user selects a selectable element, the selectable element provides a target element. The target element can execute a function, provide data, provide a sublist of selectable subelements or any combination thereof. A selectable subelement is functionally equivalent to a selectable element but is located in a sublist in a hierarchical arrangement. In such a hierarchical arrangement of selectable elements, at least one target element provides a sublist of selectable subelements.

Referring to FIG. 4, at step 400 the method determines if the target element is associated with a sublist of selectable subelements. If the target element is not associated with a sublist of selectable subelements, then an AFI is calculated in the manner described above and assigned to the selectable element corresponding to the target element. However, if the target element is associated with a sublist of selectable subelements, then at step 402 the AFI value for each selectable subelement in the sublist is determined. In one embodiment, the AFI for a selectable subelement is determined using the same steps to determine the AFI for a selectable element using steps 300–310 in FIG. 3. At step 404 each selectable subelement in the sublist is organized on the GUI based upon the respective AFI values.

In one embodiment, at step 406 the sum of the AFIs determined at step 404 for each selectable subelement is added to the AFI of the selectable element to produce a modified AFI. The selectable elements are then organized at step 204 in FIG. 2 using this modified AFI. This technique creates a modified AFI for the selectable element which takes in account the AFI for those selectable subelements associated with the selectable element.

In another embodiment, selectable elements can be organized on a GUI based upon different categories. In one embodiment, the selectable elements can be organized based upon the skill level of the user: novice, intermediate or advanced. In another embodiment, the selectable elements can be organized based upon the type of computer used by the user to access the selectable elements on the GUI. For example, if the user is a novice computer user then the FAQ provides the questions most frequently asked by novice computer users. Similarly, a user accessing an FAQ with an Sparcstation receives an FAQ with questions most frequently asked by Sparcstation users.

Typically, the user would specify a category to the method before selecting the selectable elements on the GUI. This would cause the selectable elements to be organized most efficiently for a user in this particular category. Alternatively, a configuration file for each user could be provided which specifies the categories associated with the user. In this embodiment, the invention accepts the configuration file and then organize the selectable elements on the GUI according to the categories in the configuration file. Those skilled in the art understand that each category requires an additional access frequency count for each selectable element. This enables the method to sort selectable elements based upon more than one category.

Embodiments of the present invention can be used to organize the selectable elements located on a wide variety of GUIs and for a wide variety of computer based applications. An exemplary embodiment of the invention can be used to organize selectable elements located on a web page on the World Wide Web (WWW). In particular, FIGS. 5–6 show how the present invention can be used to organize hypertext links located on a frequently asked question (FAQ) web page on the WWW.

Figure 5:
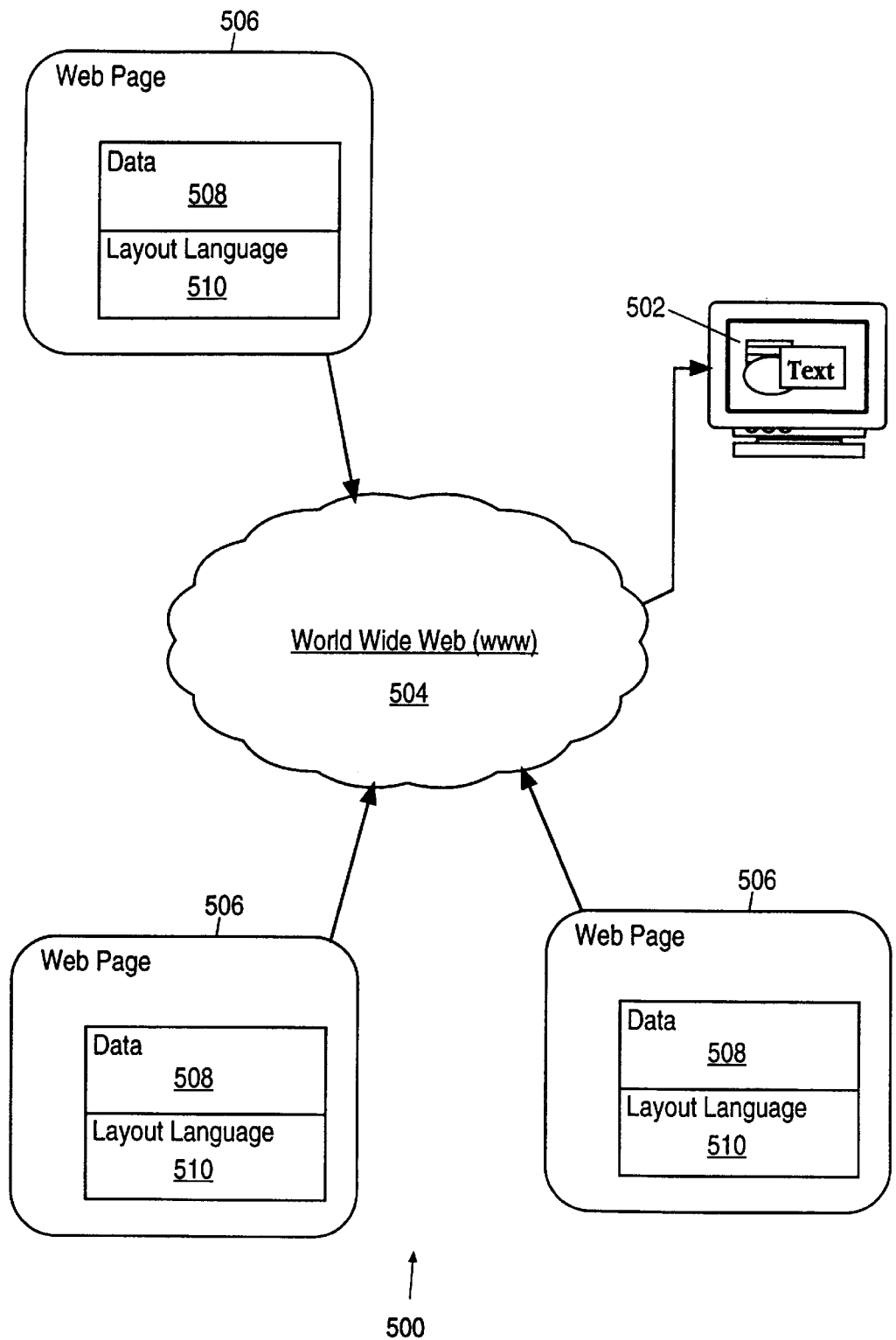
FIG. 5 illustrates a typical GUI based system designed to display information located on the world wide web (WWW)
Figure 6:
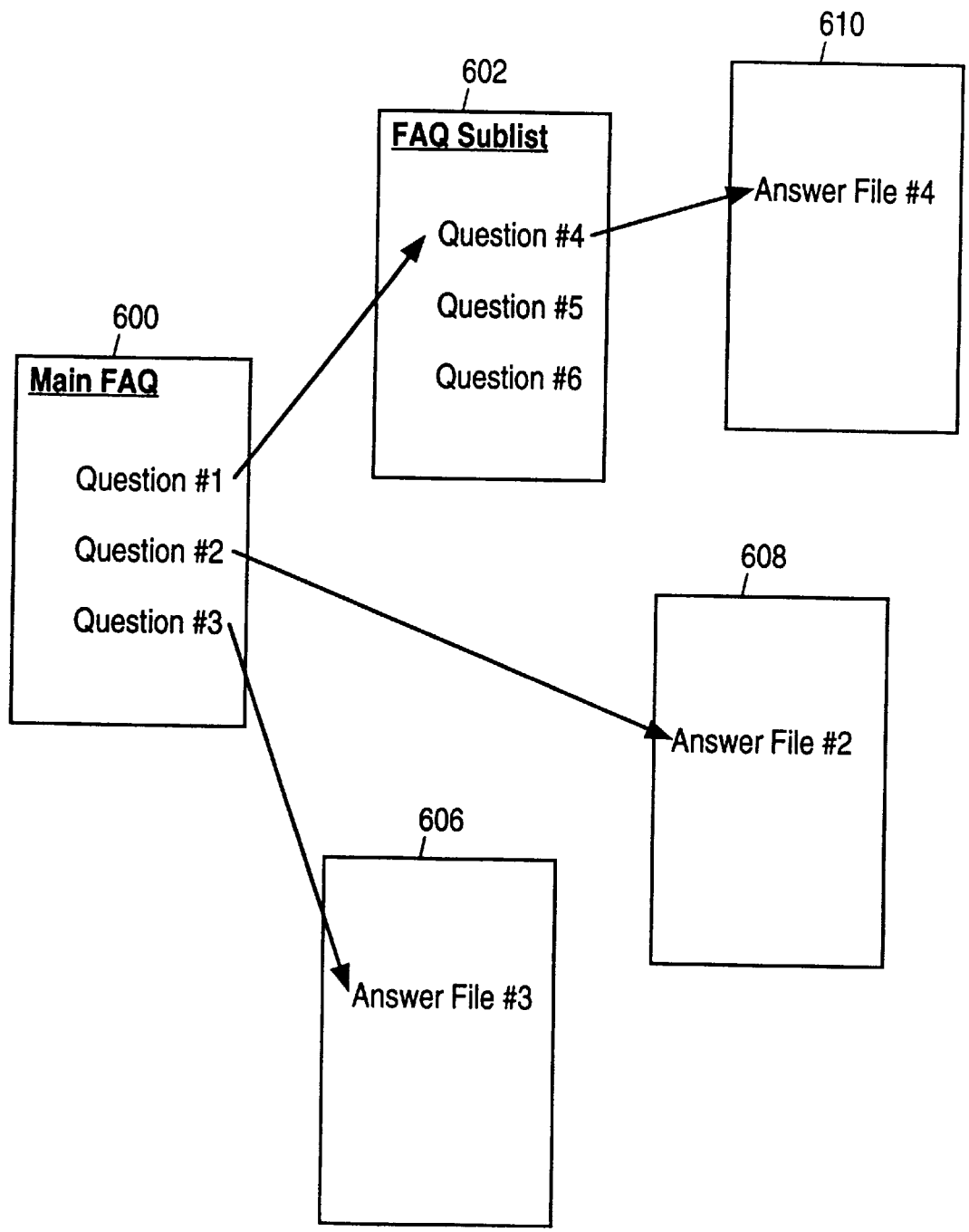
FIG. 6 is an illustration of a hierarchical Frequently Asked Question (FAQ) web page containing several questions and answers.

FIG. 5 illustrates a typical GUI based system 500 designed to display information located on the WWW 504. The WWW 504 is a warehouse for data contained in discrete storage elements called web pages. A web page 506 contains data 508 and a layout language 510 which describes how the data should be displayed. The layout language 510 used within each web page, for example, includes an combination of Java™, JavaScript™, VRML, hypertext markup language (HTML) or any other language capable of providing hypertext, GUI buttons or any other type of selectable elements. The user views a web page from the Work Wide Web using a particular type of GUI program called a browser. A browser 502 accepts the data 508 and the layout language 510 and in response produces a graphical image containing hypertext links along with text, graphics and various other types of multimedia.

Hypertext links are one type of selectable element which can be organized on a web page on the WWW using one embodiment of the present invention. One embodiment of the present invention can be used to organize the hypertext links of a frequently asked question (FAQ) web page. Each question on the FAQ web page is displayed using a hypertext link and the answer is contained in a corresponding file.

A hypertext link on the WWW can be defined using an anchor tag in HTML. The anchor tag has a target portion and a text portion. Furthermore, the anchor tag is delimited at the beginning by a "<A>" and at the end by a "</A>" character sequence. The target portion contains an entry which indicates the location of a file used to generate a web page. The text portion is the text which appears on the GUI. For example, consider a hypertext link having the following HTML anchor tag:

<A HREF=http://www.boutell.com/faq/answerweb>What is the Web?</A>

The text "What is the Web?" occupies the text portion of this HTML based hypertext link. In this example, the text is an FAQ question displayed on the display device. The target portion of this tag is "http://www.boutell.com/faq/answerweb" indicates the file which contains the answer to the question "what is the Web"? In an exemplary embodiment, the file containing the answer to the question also has a "counter" entry. The counter entry causes a counter to count the number of times the file associated with the hypertext link is accessed. This access frequency count is then used by the present invention to determine an access frequency index (AFI) for each selectable element in a manner described above. For example, the file named in the target portion of a hypertext link for an FAQ contains a counter entry using following HTML based tag:

<!--#exec cig="/cig-bin/counter/nl"-->

Selecting a FAQ hypertext link causes the file containing this counter entry in HTML to be displayed in the GUI and the counter program to be executed. The counter program keeps a list of the number of times an answer file has been selected and viewed. In one embodiment, "Counter 4.0" counts the number of times each selectable element is selected and stores the results in a file named "access_ count". Each file having a counter entry has an entry in the access_count file which indicates the cumulative number of times the file was accessed. Those skilled in the art know that counter programs are well known in the art and many other counter programs for the WWW could be substituted for a counter such as "Counter 4.0".

FIG. 6 is an illustration of a hierarchical FAQ web page containing hypertext links labeled Question#1-Question#6 and answers contained in files labeled Answer File#2, Answer File#3 and Answer File #4. In operation, a main FAQ 600 provides a FAQ sublist 602 when Question #1 is selected. Main FAQ 600 provides an Answer File#2 608 and an Answer File#3 606 when hypertext links Question#2 and Question #3 are selected respectively. FAQ sublist 602 provides an Answer File#4 when Question#4 is selected. Files Answer#4, Answer#2 and Answer #3 each contain a counter entry in HTML <!--#exec cig="/cig-bin/counter/nl"--> which counts the number of times these files are accessed by the corresponding hypertext links Question#4, Question#2 and Question#3.

At a predetermined time interval each hypertext link in main FAQ 600 is organized based upon their respective access frequency indices (AFI). In one embodiment, the access frequency counts received once each day for a period of 10 days are used to determine the AFI. In this particular case, there are two components to the AFI for Question#1 because Question#1 is associated with the selectable subelements in FAQ sublist 602. The first component of the AFI for Question#1 is based upon the number of times Question#1 is selected. The second component of the AFI for Question#1 includes the sum of AFIs associated with Question#4, Question#5 and Question#6. In contrast, the AFIs for Question#2 and Question#3 are only based upon the respective number of times Question#2 and Question#3 are accessed.

In one embodiment, the selectable elements in each list and the selectable subelements in each sublist are sorted in descending order of AFI values. First, each selectable subelement in FAQ sublist 602 are sorted based upon their respective AFI values. Next, each selectable element in Main FAQ 600 are selected based upon their respective AFI values. Those skilled in the art understand that the AFI may be used to organize selectable elements and selectable subelements in different configurations which are most efficient for the particular GUI based application.

It is important to note that the counter device, Counter 4.0 for example, reflects the number of times users all over the world using the WWW access a particular selectable element such as a hypertext link. This has the advantage of providing a large statistical sample in which one can determine accurately and dynamically which questions on a FAQ are the most frequently asked.

There are several advantages embodiments of the present invention provide which were previously unavailable in the art. First, the invention automatically organizes selectable elements on a GUI as the underlying software application evolves. Embodiments of the present invention automatically determines which selectable elements are selected most frequently. The method then organizes these selectable elements on an area of the GUI which is easy to access by a user.

Second, the invention can organize selectable elements based upon different categories of users. For example, the selectable elements on the GUI are initially organized in a manner which is most effective for a beginning user. This organization of selectable elements provides the novice user with selectable elements commonly used by beginners. As the user becomes more advanced, the selectable elements are organized in a manner which is most effective for an advanced user. Embodiments of the present invention automatically organize the selectable elements in a manner most efficient for a user in each category.

Third, embodiments of the present invention organize selectable elements more efficiently because the method uses statistically significant sample set. In the past, computer application designers would organized selectable elements on a GUI based on the input from a relatively small number of samples. The samples were limited by the time each computer application designer had to run surveys and do usability tests. In contrast, embodiments of the present invention continuously collect usage information over networks, such as the World Wide Web (WWW) and the Internet, and process the data immediately. The sample sets used by the invention will continue to grow as more users utilize GUI based applications over networks.

Fourth, the present invention is more efficient because it automates a time consuming task. In the past, the organization of selectable elements on a GUI was based upon information collected manually. The present invention utilizes a computer application to determine how often a selectable element is selected and organizes the selectable elements in an efficient manner on a GUI. The present invention is efficient, accurate and quick.

While specific embodiments have been described herein for purposes of illustration, various modifications may be made without departing from the spirit and scope of the invention. The present invention is not limited for use with GUI systems designed for the WWW. One skilled in the art could apply the teachings and suggestions of the present invention to any GUI based system capable of providing selectable elements. Selectable elements includes all portions of the GUI which are responsive to the input signals from a pointing device or a character based input device. This includes hypertext links and GUI buttons provided on the GUI. Nor is the present invention limited to using the aforementioned counter application "Counter 4.0". This particular application is provided merely as an example and should not be construed to limit the system to the techniques provided by this particular application. Those skilled in the art should understand that other counter programs well known in the art work with embodiments of the present invention. Accordingly, the invention should be interpreted in light of the claims and the full scope of their equivalents and not limited to the above described embodiments.

What is claimed is:

1. A computer implemented method of automatically organizing selectable elements on a graphical user interface (GUI), comprising the steps of:

(1) providing a list of at least two selectable elements for display on a GUI, each selectable element in said associated with a respective target element;

(2) generating a first access frequency index for each selectable element in said list corresponding to a number of times said selectable element has been selected by a plurality of users; and (3) organizing said selectable elements with a higher first access frequency index in a first area on said GUI and said selectable elements with a lower first access frequency index in a second area on said GUI, whereby a current user can select said selectable elements organized on said GUI in a more efficient manner.

2. The method in claim 1 wherein said selectable elements located in said first area on said GUI are more easily selected with a pointing device than said selectable elements located in said second area on said GUI.

3. The method in claim 1 wherein at least two of said selectable element are hypertext links.

4. The method in claim 1 wherein at least two of said selectable elements are GUI buttons.

5. The method in claim 1 performed over a computer based network having a server computer system and a client computer system, wherein said server computer system performs said steps associated with organizing said selectable elements on a GUI.

6. The method in claim 1 performed over a computer based network having a server computer system and a client computer system, wherein said client computer system performs said steps associated with organizing said selectable elements on a GUI.

7. The method in claim 1 wherein said list of selectable elements only includes selectable elements in a predetermined category.

8. The method in claim 7 wherein said predetermined category is selected from a list of user types including novice users, intermediate users and advanced users.

9. The method in claim 7 wherein said predetermined category is selected from a list of operating systems including Unix, DOS, Windows, and MacIntosh.

10. A computing apparatus configured to automatically organize selectable elements on a graphical user interface (GUI), comprising:

(1) a mechanism configured to provide a list of at least two selectable elements for display on a GUI, each selectable element in said list associated with a respective target element;

(2) a mechanism configured to generate a first access frequency index for each selectable element in said list corresponding to a number of times said selectable element has been selected by a plurality of users; and (3) a mechanism configured to organize said selectable elements with a higher first access frequency index in a first areas on said GUI and said selectable elements with a lower first access frequency index in a second area on said GUI, whereby a current user can select said selectable elements organized on said GUI in a more efficient manner.

11. The apparatus in claim 10 wherein said selectable elements located in said first area on said GUI are more easily selected with a pointing device than said selectable elements located in said second area on said GUI.

12. The apparatus of claim 10 wherein at least two of said selectable elements are hypertext links.

13. The apparatus in claim 12 wherein at least two of said selectable elements are GUI buttons.

14. The apparatus in claim 10 further comprising a computer based network having a server computer system and a client computer system, wherein said server computer system is configured to organize said selectable elements on a GUI.

15. The apparatus in claim 10 further comprising a computer based network having a server computer system and a client computer system, wherein said client computer system is configured to organize said selectable elements on a GUI.

16. A computer program product for automatically organizing selectable elements on a graphical user interface (GUI) comprising:

a computer readable memory medium;

(1) computer controlling instructions, stored on said medium, to provide a list of at least two selectable elements for display on a GUI, each selectable element in said list associated with a respective target element;

(2) computer controlling instructions, stored on said medium, to generate a first access frequency index for each selectable element in said list corresponding to a number of times said selectable element has been selected by a plurality of users; and (3) computer controlling instructions, stored on said medium, to organize said selectable elements with a higher first access frequency index in a first area on said GUI and said selectable elements with a lower first access frequency index in a second area on said GUI, whereby a current user can select said selectable elements organized on said GUI in a more efficient manner.

17. The computer program product in claim 16 wherein said selectable elements located in said first area on said GUI are more easily selected with a pointing device than said selectable elements located in said second area on said GUI.

18. The code in claim 16 wherein at least two of said selectable element are hypertext links.

19. The code in claim 16 wherein at least two of said selectable element are GUI buttons.

20. The code in claim 16 further comprising a computer based network having a server computer system and a client computer system, wherein said server computer system is configured to organize said selectable elements on a GUI.

21. The computer program product in claim 16 further comprising computer controlling instructions, stored on said medium, for controlling a computer based network having a server computer system and a client computer system such that said client organizes said selectable elements on a GUI at said client.

* * * * *